(12) United States Patent
Shmueli et al.

(10) Patent No.: US 7,900,008 B2
(45) Date of Patent: Mar. 1, 2011

(54) DISK SPACE ALLOCATION

(75) Inventors: Boaz Shmueli, Washington, DC (US);
James J. Seeger, Jr., Portland, OR (US);
Jason C. Young, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/127,233

(22) Filed: May 27, 2008

(65) Prior Publication Data
US 2008/0229047 A1    Sep. 18, 2008

Related U.S. Application Data

(63) Continuation of application No. 10/850,927, filed on May 21, 2004, now Pat. No. 7,409,518.

(51) Int. Cl.
*G06F 12/02* (2006.01)
(52) U.S. Cl. ... 711/163; 711/170; 711/147; 711/E12.002
(58) Field of Classification Search .......................... None
See application file for complete search history.

(56) References Cited

U.S. PATENT DOCUMENTS

| | | | |
|---|---|---|---|
| 4,910,663 A | 3/1990 | Bailey | |
| 5,159,678 A | 10/1992 | Wengelski et al. | |
| 5,845,129 A | 12/1998 | Wendorf | |
| 6,023,744 A | 2/2000 | Shoroff et al. | |
| 6,052,729 A | 4/2000 | Robinson | |
| 6,141,722 A | 10/2000 | Parsons | |
| 6,505,283 B1 | 1/2003 | Stoney | |
| 6,539,464 B1 | 3/2003 | Getov | |
| 2004/0039884 A1 | 2/2004 | Li | |
| 2004/0054839 A1 | 3/2004 | Lee et al. | |

*Primary Examiner* — Michael C Krofcheck
(74) *Attorney, Agent, or Firm* — Lieberman & Brandsdorfer, LLC

(57) ABSTRACT

A method and system for allocating blocks of disk in persistent storage to requesting threads. A primary data structure is provided for organizing and categorizing blocks of disk space. In addition, a secondary data structure is provided for maintaining a list of all active file system processes and blocks of disk space used by those processes. Blocks of disk space are assigned to pages. At such time as a thread may request allocation of disk space, both data structures are reviewed to determine if the requested disk space is available and to limit access of available disk space to a single page of memory to a single thread at any one time.

15 Claims, 5 Drawing Sheets

DISK SPACE ALLOCATION

CROSS REFERENCE TO RELATED APPLICATION(S)

This application is a continuation of application Ser. No. 10/850,927, filed on May 21, 2004, now pending, which is hereby incorporated herein by reference.

BACKGROUND OF THE INVENTION

1. Technical Field

This invention relates to allocation of space in persistent storage. More specifically, the invention relates to efficiently allocating blocks of persistent storage while concurrently mitigating contention among multiple threads.

2. Description of the Prior Art

File systems and databases are comprised of a plurality of files, with each individual file using disk space from persistent storage. In certain implementations, a block serves as a basic unit of space allocation in a file system and database. When a new file is created or an existing file is extended, it will require new or additional blocks of disk space within persistent storage. Similarly, when a new database is created or an existing database is extended, it will require new or additional blocks within persistent storage. A free space bit map (FSBM) is used to track blocks of space from persistent storage which are available for allocation to a file. The FSBM is a part of the file system metadata or database metadata. The FSBM is stored in persistent storage and is typically divided into pages. The FSBM is comprised of a string of bits, wherein each bit represents one block of disk space from persistent storage. When the file system or database is initially created, all bits in the FSBM are available. As files are created and written, the associated block becomes unavailable and this is recorded in the FSBM. Similarly, when files or databases are truncated or deleted, bits in the FSBM may once again become available.

FIG. 1 is a block diagram (30) of a sample free space bit map. In this example there are seven entries (32), (34), (36), (38), (40), (42), and (44), with each entry corresponding to blocks of disk space in associated persistent storage. Each entry in the free space bit map has a bit, and the value of the bit denotes whether the corresponding block of disk space in persistent storage is currently in use. In one embodiment, the value of zero is representative of availability of corresponding disk space, and a value of one is representative of unavailability of corresponding disk space. As shown in FIG. 2, the first entry (32), the second entry (34), the third entry (36), and the fifth entry (40) are all represented by a bit value of one indicating each of the corresponding blocks of disk space in persistent storage are currently in use and unavailable to a file or database. The fourth entry (38), the sixth entry (42), and the seventh entry (44), are all represented by a bit value of zero indicating that the corresponding blocks of disk space in persistent storage are not in use and are available for allocation to a file or database.

In the prior art, a request for persistent storage space will institute a search of the FSBM starting from an ending position of a prior search of the FSBM. Routines for allocating blocks of disk space from the persistent storage require a linear search of the FSBM for a series of consecutive bits that will fulfill the disk space required for the allocation. The size of the FSBM corresponds to the size of the persistent storage space, i.e. a large storage system will have a large FSBM. Therefore, a linear search of the FSBM is inefficient due to the size of the FSBM, and the fact that it is not part of the computer's random access memory. In addition, in a computer system supporting multiple processes, it is foreseeable that several threads may try to perform an allocation of persistent storage space at the same time. Prior art routines serialize access of threads to pages of the FSBM. However, serialized access of the FSBM does not allow multiple threads to access pages of the FSBM simultaneously. Accordingly, there are limitations associated with prior art management and allocation of persistent storage space.

Therefore, there is a need for efficiently coordinating access to persistent storage that eliminates the need to conduct a linear search of the FSBM to determine availability of consecutive bits in accordance with size requirements of a space request. In addition, there is a need for accommodating access to the FSBM by multiple processing threads.

SUMMARY OF THE INVENTION

The present invention comprises a method and system for organizing persistent storage space and access thereto.

In one aspect of the invention, a computer system is provided. The system includes a primary data structure adapted to maintain a list of available runs of blocks of persistent memory. A manager is provided to categorize the runs of blocks according to their length. In addition, the system includes a coordinator adapted to allocate the categorized blocks between the primary data structure and a thread.

In another aspect of the invention, an article is provided with a computer-readable medium. Means in the medium are provided for maintaining a list of available runs of blocks of persistent memory and for categorizing the runs of blocks in the primary data structure. In addition, means in the medium are provided for coordinating allocation of the categorized blocks between the primary data structure and a thread.

In yet another aspect of the invention, an article is provided with a computer readable carrier including computer program instructions configured to allocate storage space. Instructions are provided to maintain a list of available run of blocks of persistent memory in a primary data structure, and to categorize the run of blocks according to length. A secondary data structure is provided together with instructions to maintain the secondary data structure in communication with the primary data structure. The secondary data structure includes a list of all active file system processes and blocks used by the processes. For each associated page, instructions are provided to categorize the run of blocks in the secondary data structure according to page lengths of the run and active threads. Instructions are provided to coordinate allocation of the categorized run between the primary data structure, the secondary data structure and a thread, and to deny access of multiple requesting threads to the run based on a prior thread allocation. An allocation of the run of blocks to a requesting thread responsive to availability of the run in the primary and secondary data structures.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Two data structures are utilized to efficiently allocate and deallocate blocks of persistent memory to threads. The primary data structure, stored in random access memory (RAM), organizes contiguous blocks of memory, i.e. runs, according to the length of the space available. Each entry in the primary data structure holds entries for runs of persistent memory having a predefined length. In addition, each entry in the primary data structure includes a pointer to a location in the associated FSBM identifying the starting location, i.e. offset, of the available space. When a process requires an allocation of persistent memory of a predefined length, a search of the corresponding entry in the primary data structure will efficiently indicate whether the space is available. The secondary data structure, stored in random access memory (RAM) organizes information about a process. Each active process will have an entry in the secondary data structure with information containing the starting location in the FSBM and the length of the space allocation. The starting location in the FSBM will indicate the page in the FSBM in which the space allocation is referenced. The secondary data structure limits allocation of persistent memory of a process to a single page in the FSBM at any one time. Accordingly, the primary data structure with the secondary data structure function together to efficiently allocate persistent memory space while supporting concurrent memory allocations.

Technical Details

Figure 1:
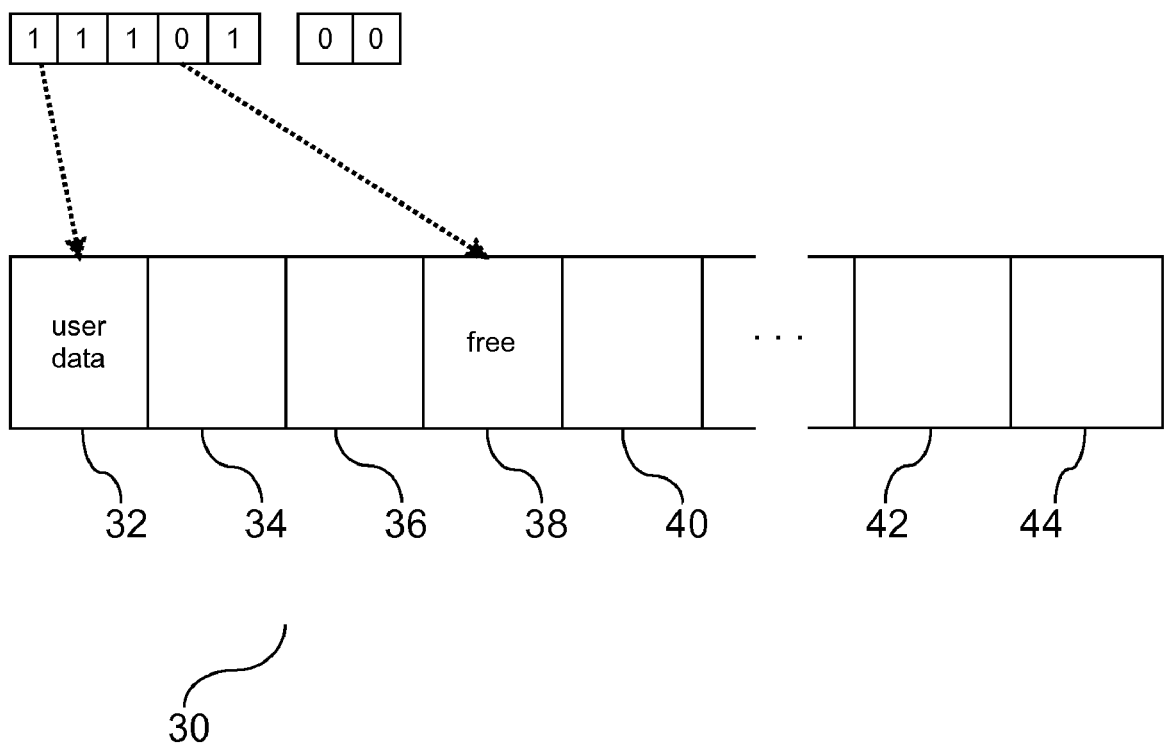
FIG. 1 is a prior art block diagram of a free space bit map.
Figure 2:
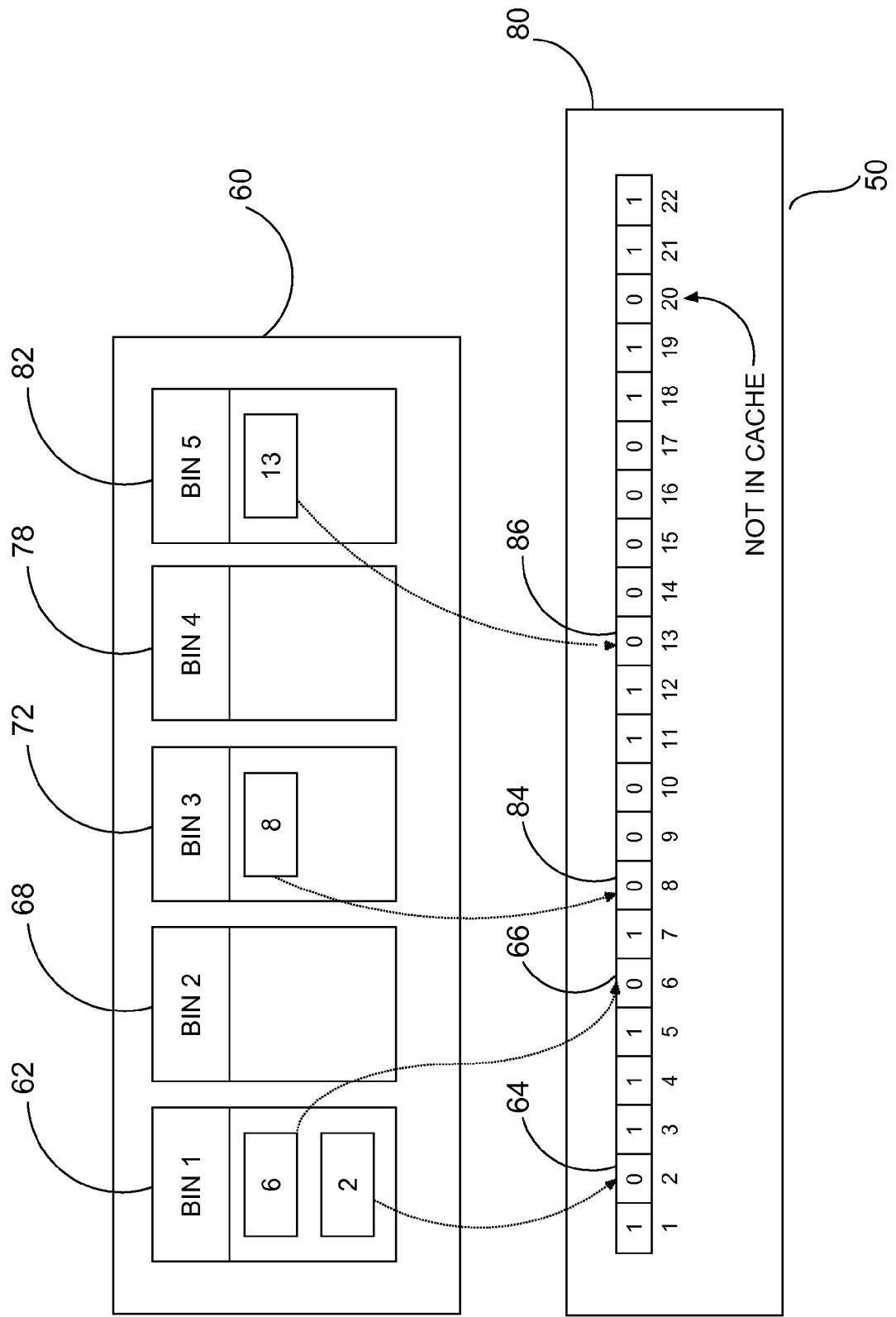
FIG. 2 is a block diagram of the primary data structure.

FIG. 2 is a block diagram (50) illustrating a data structure (60) in communication with the FSBM (80). The data structure is organized according to the length allocation of disk space. Each entry in the data structure correlates to the number of consecutive blocks, i.e. a length of adjacent blocks of memory in the disk space. In one embodiment, the maximum length of a single allocation may have a limit, wherein the maximum number of entries in the data structure is set to the maximum length of a single allocation. Each entry in the data structure includes a bit offset number corresponding to a starting position in the FSBM referencing the disk space location in the associated storage system. For illustration purposes, there are five entries (62), (68), (72), (78), and (82) for the data structure (60). The first entry (62) correlates to a run of one block of available disk space in the FSBM (80), the second entry (68) correlates to a run of two blocks of available disk space in the FSBM (80), the third entry (72) correlates to a run of three blocks of available disk space in the FSBM (80), the fourth entry (78) correlates to a run of four blocks of available disk space in the FSBM (80), and the fifth entry (82) correlates to a run of five blocks of available disk space in the FSBM (80). As shown in the corresponding FSBM (80), there are two locations showing a run of one block and the positions of the starting point of each of these runs are referenced in the first entry (62) as (64) and (66). Similarly, the second entry (68) and the fourth entry (78) in the data structure (60) do not have any FSBM entries as there are no runs shown with two or four consecutive blocks, respectively, of available disk space. However, both the third entry (72) and the fifth entry have one entry each in the FSBM with a run length of three blocks and five blocks available, respectively.

The purpose of the primary data structure (60) is to organize runs of available disk space in a manner that enables efficient allocation of sequential blocks of disk space to a requesting thread. There are two basic operations associated with the primary data structure (60). The first operation is to remove an entry from the data structure to a requesting thread if there is a run available of the requested length of sequential blocks of disk space. If there is no run available as referenced in the primary data structure, the requesting thread is notified. In one embodiment, a return of a predefined integer is an indication that the run is not available. The second operation is to add an entry run into the data structure of available disk space. The added run is placed in an entry in the primary data structure (60) that corresponds to the quantity of consecutive blocks of disk space. In addition, a corresponding offset number, indicating a starting position of the block of disk space in the FSBM, is placed in the entry.

Figure 3:
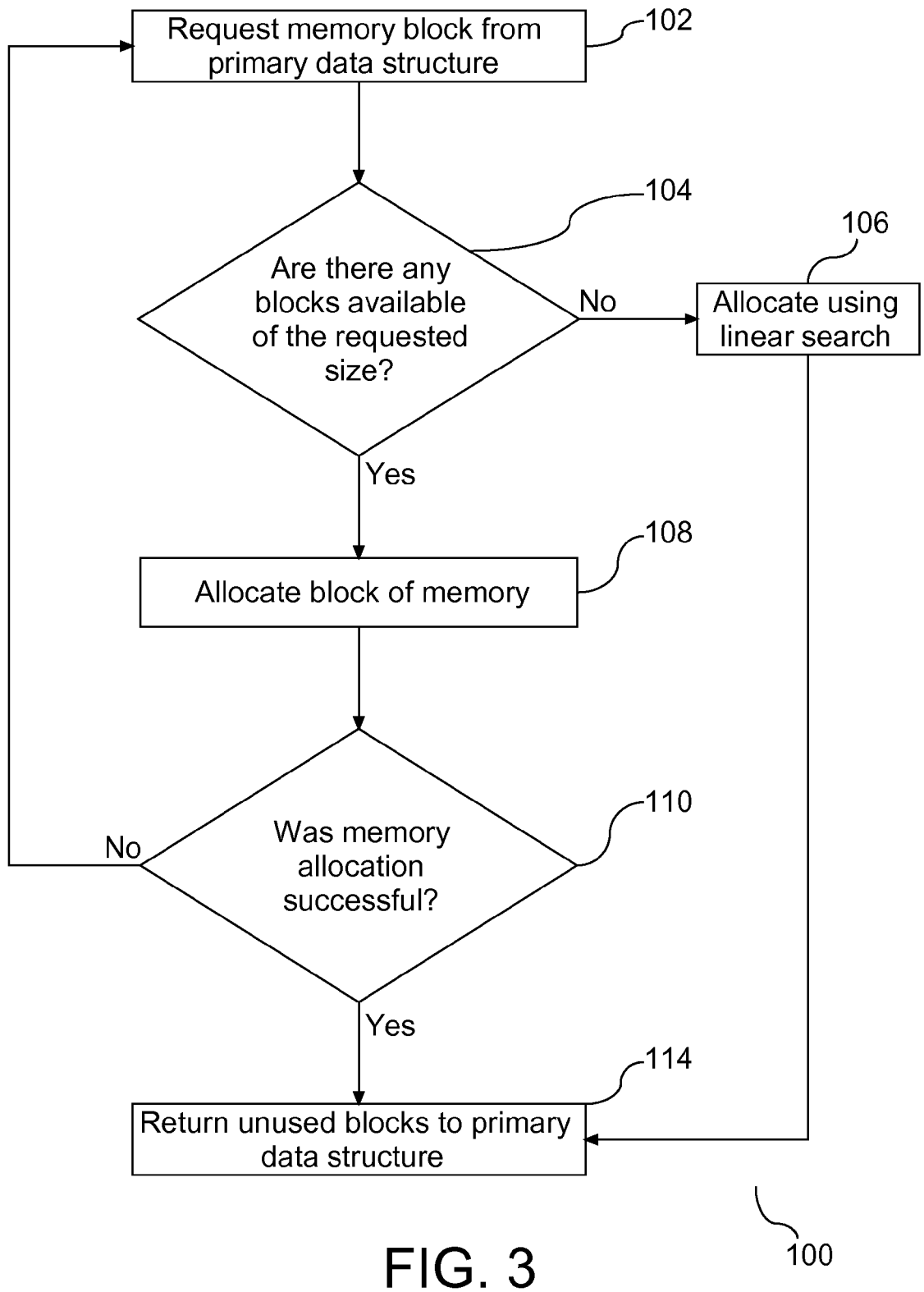
FIG. 3 is a flow chart demonstrating allocation of a blocks of memory in persistent storage to one requesting thread.

The process of allocating blocks of disk space to a requesting thread differs depending upon whether the process supports a single thread implementation or a concurrent thread implementation. FIG. 3 is a flow chart (100) illustrating the process of a single thread requesting a disk space allocation from the primary data structure. The thread requests a block allocation of a specified run length from the primary data structure (102). Prior to honoring the request, a test is conducted to determine if there are any runs of disk space of the requested length available (104). A negative response to the test at step (104) will result in initiation of a linear search of the FSBM (106). However, a positive response to the test at step (104) is determinative that there is a block of disk space available based on the length requested. The block of available disk space is allocated to the requesting thread (108). Thereafter, a test is conducted to determine if the disk space allocation to the requesting thread was successful (110). A negative response to the test at step (110) will return the disk space allocation process to step (102). Subsequent to the completion of the linear search at step (106) or a positive response to the test at step (110), all blocks of disk space not in use are returned to the primary data structure to make them available for the next requesting thread (114).

The process of allocating blocks of disk space to a requesting thread in a single thread implementation shown above provides an allocation to the requesting thread of an offset number corresponding to a starting position of an available block of disk space in the FSBM. This process is repeated until a valid offset number is returned to the thread or the allocation fails after resorting to a linear search.

In addition to requesting an allocation of disk space from the primary data structure, blocks of disk space may be added to the primary data structure. The process of adding block entries into the primary data structure occurs in response to one of the following three events: a run of blocks is deallocated by a thread, the FSBM is created or extended, or the number of entries in the primary data structure falls below a threshold. When a run of blocks is deallocated by a thread, this is an indication that the system no longer requires the associated block of disk space. Thereafter, the block of disk space is returned to an entry in the primary data structure corresponding to the number of consecutive block(s). In addition, the FSBM may be extended at such time as storage media is added to the file system or database. This results in availability of additional disk storage space. The available disk space is divided into a predefined maximum length of consecutive block allocations, and the block(s) of disk space is returned to an entry in the primary data structure corresponding to the number of consecutive blocks, with each entry having an offset number designating the starting location of the respective entry in the FSBM. In order to maintain operating efficiency associated with allocation of disk space, the primary data structure must maintain a minimum number of entries. At such time as the quantity of entries in the primary data structure goes below a predefined threshold, a scan is initiated to search for available blocks in the FSBM. When an available run block is found, the associated run block is placed in the appropriate entry in the primary data structure with an offset number corresponding to the starting position of the run block in the FSBM.

Figure 4:
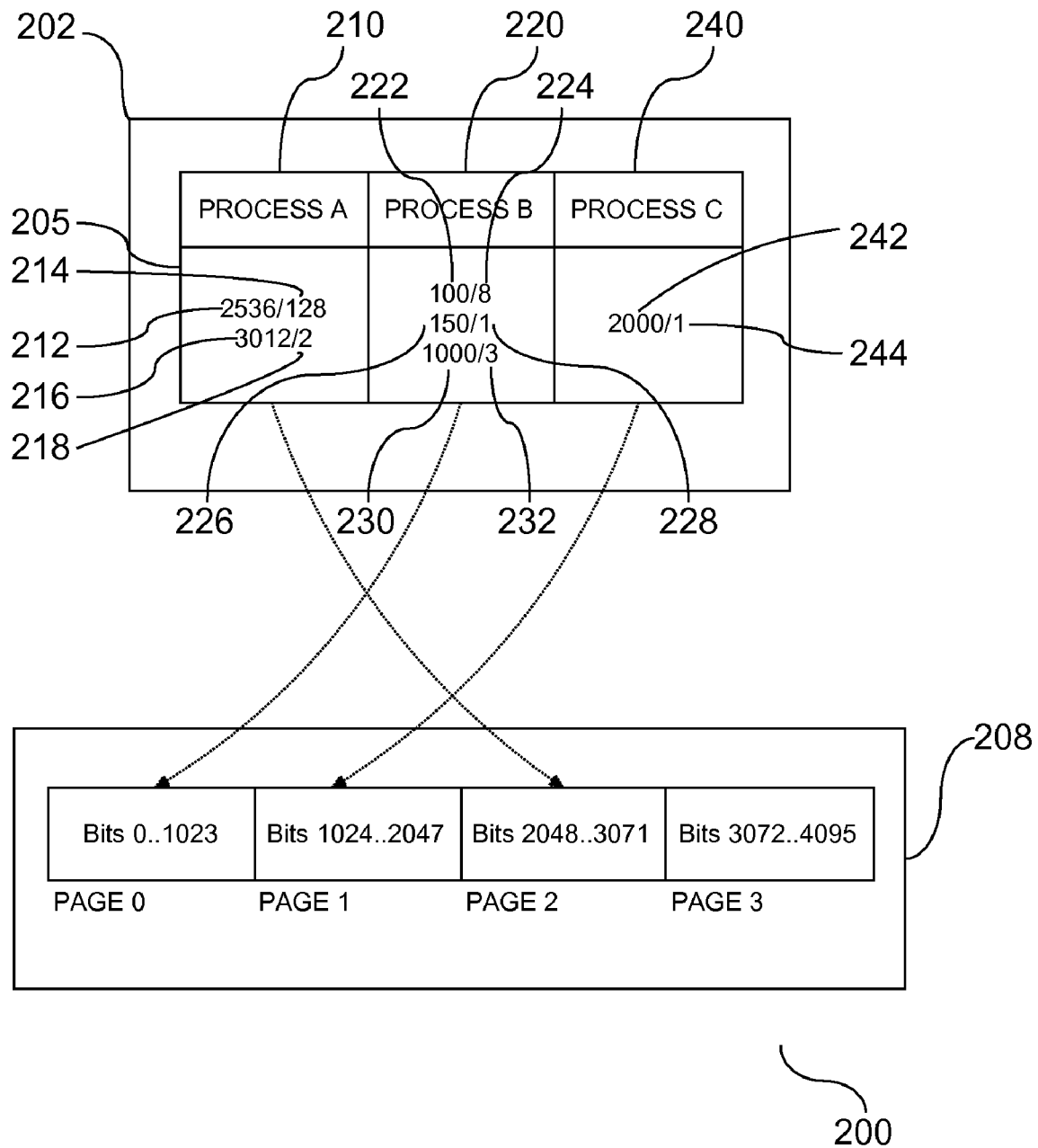
FIG. 4 is a block diagram of the secondary data structure.

As shown above, the primary data structure may be used in conjunction with a single thread implementation. To employ the primary data structure for use in a system that supports parallel processing, a secondary data structure is implemented to maintain a list of all active file system threads and the active memory block entries associated with these threads. FIG. 4 is a block diagram (200) of the secondary data structure (202) for use in a multi-threaded system that accommodates concurrent file system operations. The secondary data structure includes a table of processes (205) that corresponds to the FSBM (208). In this example, three processes (210), (220), and (240) are shown. The first process (210) has two entries, with each entry having two numbers. The first number of the first entry is an offset bit number (212) corresponding to the position of the memory block allocation in the FSBM (208), and the second number of the first entry indicates the number of consecutive blocks allocated (214). The first number of the second entry is an offset bit number (216) corresponding to the position of the memory block allocation in the FSBM (208), and the second number of the second entry indicates the number of consecutive blocks allocated (218). Similarly, the second and third processes (220), (240) each have an offset bit number (222), (226), (230), (242) and a corresponding integer indicating the length of consecutive blocks allocated (224), (228), (232), (244), respectively. Accordingly, blocks of disk space allocated to each file system process is stored in the secondary data structure (202).

To minimize contention among concurrent threads requesting allocation of blocks of disk space, the process of allocating blocks of disk space is modified from the single thread process. As mentioned above, the FSBM is divided into pages, with each page representing a defined portion of the persistent storage space. In one embodiment, the FSBM may be configured so that a single page represents a set quantity of blocks in the file system or database. In one embodiment, page 0 would include 0 through 1023, page 1 would include blocks 1024 through 2047, page 2 would include blocks 2048 through 3071, and page 3 would include blocks 3072 through 4095, etc. The length of a page in the FSBM may be modified to be larger or smaller. As shown in FIG. 3, process$_A$ uses blocks on page$_2$, process$_B$ uses blocks on page$_0$, and process$_C$ uses blocks on page$_1$. The division of the FSBM into multiple pages is advantageous in managing concurrent processes' access to blocks of disk space.

Figure 5:
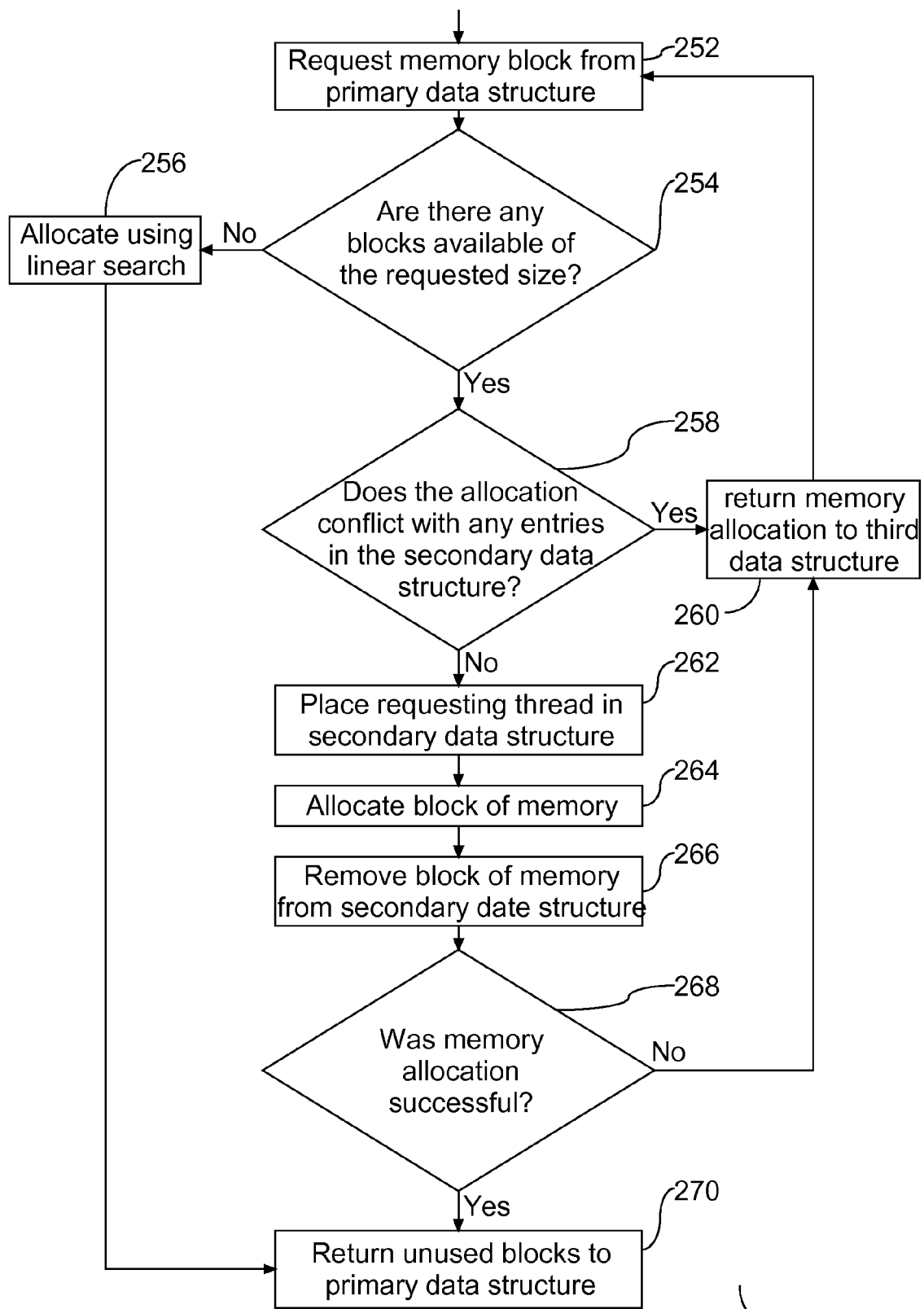
FIG. 5 is a flow chart demonstrating allocation of blocks of memory in persistent storage to a requesting thread according to the preferred embodiment of this invention, and is suggested for printing on the first page of the issued patent.

FIG. 5 is a flow chart (250) illustrating the combination of the functionality of the primary data structure together with the secondary data structure. A thread places a request for a block allocation from the primary data structure (252). Prior to honoring the request, a test is conducted to determine if there are any blocks of disk space available according to the length requested by the thread (254). A negative response to the test at step (254) will result in initiation of a linear search of the FSBM (256). However, a positive response to the test at step (254) is determinative that there is a block of disk space available based on the length requested. A subsequent test is then conducted to determine if the disk space allocation of the thread from step (252) conflicts with a current disk space allocation in the secondary data structure (258). This test reviews the entries in the secondary data structure to determine if there are any threads using blocks from the same page in the FSBM. A positive response to the test at step (258) will prevent allocation of the disk space and return the disk space allocation to a third data structure adapted to store a list of blocks that conflict with the thread request (260), and thereafter return to step (252) for another allocation which would be different from the prior allocation. The test at step (258) permits only one thread to access a single page in the FSBM at any time. However, a negative response to the test at step (258) will result in placement of the entry of the requesting thread in the secondary data structure (262), followed by an allocation of the block of disk space to the requesting thread (164), as it has been determined that this allocation does not conflict with a different allocation. Once the allocation is complete, the block of disk space is removed from the secondary data structure (266). Thereafter, a test is conducted to determine if the disk space allocation to the requesting thread was successful (268). A negative response to the test at step (268) will return the disk space allocation process to step (260), and thereafter return to step (252). Subsequent to the completion of the linear search at step (256) or a positive response to the test at step (268), all blocks of disk space not in use are returned to the primary data structure (270) to make them available for the next requesting thread.

Advantages Over the Prior Art

The method and system shown herein enable efficient allocation and deallocation of blocks of disk space. The primary data structure organizes and categorizes available blocks of disk space based upon the length of the run. At the same time, the primary data structure functions in conjunction with the FSBM and the secondary data structure to monitor availability of disk space in a multithreaded computing system to support concurrent allocation and deallocation of runs by multiple threads. The secondary data structure monitors the pages in use in the FSBM to ensure that only one process accesses a single page of the FSBM at any time. Accordingly, the combination of the primary data structure with the secondary data structure efficiently allocates disk space to a requesting thread while supporting concurrent allocation of disk space to multiple processes.

Alternative Embodiments

It will be appreciated that, although specific embodiments of the invention have been described herein for purposes of illustration, various modifications may be made without departing from the spirit and scope of the invention. In particular, a scan of the FSBM may be invoked when a quantity of blocks in the primary data structure falls below a predefined threshold, or at such time as a request to the primary data structure is conducted and there are no blocks available. To prevent unnecessary scans of the FSBM, this process should be limited to completing a previous scan of the FSBM that was not completed. The scan begins at the offset position where the previous scan ended. In addition, if an entry in the primary data structure for a specified block length is empty, a larger length run may be allocated to the process. The process utilizes the necessary portion of the run according to the original length requested, and the remaining portion of the run is returned to an entry in the primary data structure corresponding to the length of the returned block. Also, a special maintenance process can be invoked periodically, operating on the primary data structure, to try and coalesce entries in the primary data structure. For example, if there is an entry for a run length of 3 at offset 100 and another entry for a run length of 5 at offset 103, these two entries can be joined and transformed to a single entry of length 8 and offset 100, thus reducing the number of entries in the primary data structure while being able to satisfy longer allocation requests. Additionally, the secondary data structure is utilized to limit access to a single page of the FSBM to one thread at any one time. However, if another thread requires access to the same page of the FSBM, it may wait for the prior thread to complete the access. Finally, disk space may include space in secondary storage media, such as magnetic disks, readable/writeable storage devices, optical disks, etc. Accordingly, the scope of protection of this invention is limited only by the following claims and their equivalents.

We claim:

1. A computer system comprising:
   a primary data structure maintaining a list of available run of blocks of persistent memory;
   a manager categorizing said run of blocks according to length;
   a secondary data structure in communication with said primary data structure maintaining a list of all active file system processes and blocks used by said processes;
   each run of blocks in said secondary data structure is associated with a bitmap page;
   a coordinator allocating at least one of said run of blocks to a requesting thread based upon said primary data structure and said secondary data structure, wherein said coordinator limits concurrent access of multiple requesting threads to a bitmap page assigned to said blocks to a single thread at a time; and
   at least one of said run of blocks allocated to a requesting thread in response to availability of said run in said primary and secondary data structure.

2. The system of claim 1, wherein said active file system processes include a pointer to said bitmap page assigned to a run block of persistent memory.

3. The system of claim 1, wherein said coordinator scans said blocks and adds an entry of available blocks to said primary data structure.

4. The system of claim 3, wherein said scan is terminated in response to criteria selected from a group consisting of: said primary data structure is full, and entire memory space has been scanned.

5. The system of claim 1, wherein said coordinator organizes an action selected from a group consisting of: allocation of a block to a requesting thread, and addition of an expired block to said primary data structure.

6. An article comprising:
   a computer-readable recordable medium;
   means in the medium for maintaining a list of available run of blocks of persistent memory;
   means in the medium for categorizing said run of blocks in a primary data structure;
   means in the medium for maintaining a list of all active file system processes and blocks used by said processes in a secondary data structure, wherein each run of blocks is associated with a bitmap page;
   means in the medium for coordinating allocation of at least one of said run of blocks to a requesting thread based upon said primary and secondary data structures;
   means in the medium for limiting concurrent access of multiple requesting threads to a bitmap page assigned to said blocks to a single thread at any one time; and
   allocating at least one of said a run of blocks to a requesting thread in response to availability of said run in said primary and secondary data structures.

7. The article of claim 6, wherein said file system processes include a pointer to said bitmap page assigned to said run of block of persistent memory.

8. The article of claim 6, wherein said means for coordinating allocation of said categorized blocks between said primary data structure and a thread is adapted to organize an action selected from a group consisting of: allocation of a block to a requesting thread, and addition of an expired block to said primary data structure.

9. The article of claim 6, wherein said means for coordinating allocation of said categorized block is adapted to scan said blocks and add an entry of available blocks to said primary data structure.

10. The article of claim 9, wherein said scan is adapted to be terminated in response to criteria selected from a group consisting of: said primary data structure is full, and entire memory space has been scanned.

11. An article comprising:
    a computer readable recordable medium including computer program instructions configured to allocate storage space, comprising:
    instructions maintaining a list of available run of blocks of persistent memory in a primary data structure;
    instructions categorizing the run of blocks according to length;
    instructions maintaining a secondary data structure in communication with the primary data structure, wherein the secondary data structure includes a list of all active file system processes and blocks used by the processes;
    instructions associating each of the run of blocks in the secondary data structure with a bitmap page;
    instructions coordinating allocation of the runs of blocks based upon the primary data structure, the secondary data structure and a thread;
    instructions enying access of multiple requesting threads to the bitmap page based on a prior thread allocation, wherein a concurrent bitmap access by multiple threads is restricted by a length of the bitmap page; and
    an allocation of at least one run of blocks to a requesting thread responsive to availability of the run in the primary and secondary data structures.

12. The article of claim 11, wherein each active file system process includes a pointer to a bitmap page assigned to a run block of persistent memory.

13. The article of claim 11, wherein the instructions coordinating allocation of the blocks between the primary data structure and a thread includes a scan of the blocks and instructions to add an entry of available blocks to the primary data structure.

14. The article of claim 13, further comprising instructions to terminate the scan based upon criteria selected from the group consisting of: a full primary data structure, and a completed scan memory space in its entirety.

15. The article of claim 11, wherein the instructions coordinating allocation of the categorized block between the primary data structure and the thread includes an organization instruction selected from the group consisting of: an instruction to allocate the blocks to a requesting thread, and an instruction to add expired blocks to the primary data structure.

* * * * *